United States Patent
Chan et al.

(10) Patent No.: US 10,532,335 B1
(45) Date of Patent: Jan. 14, 2020

(54) HAIR COLORANT DISPENSING SYSTEM

(71) Applicant: eSalon.com, LLC, Culver City, CA (US)

(72) Inventors: Aaron Chan, Los Angeles, CA (US); Anthony Brzozowski, Los Angeles, CA (US); Francisco Gimenez, Los Angeles, CA (US); Rabih Zaouk, Los Angeles, CA (US)

(73) Assignee: eSalon.com, LLC, Culver City, CA (US)

( * ) Notice: Subject to any disclaimer, the term of this patent is extended or adjusted under 35 U.S.C. 154(b) by 0 days.

(21) Appl. No.: 16/291,987

(22) Filed: Mar. 4, 2019

(51) Int. Cl.
- *B01F 13/10* (2006.01)
- *A45D 44/00* (2006.01)
- *B01F 15/00* (2006.01)
- *G06Q 30/06* (2012.01)

(52) U.S. Cl.
CPC ........ *B01F 13/1063* (2013.01); *A45D 44/005* (2013.01); *B01F 13/1066* (2013.01); *B01F 13/1069* (2013.01); *B01F 15/00194* (2013.01); *B01F 2215/0031* (2013.01); *G06Q 30/0621* (2013.01)

(58) Field of Classification Search
CPC .............. B01F 13/1063; B01F 13/1066; B01F 13/1069; B01F 15/00194; B01F 2215/0031; A45D 44/005; G06Q 30/0621
USPC .......................................................... 366/141
See application file for complete search history.

(56) References Cited

U.S. PATENT DOCUMENTS

| | | | |
|---|---|---|---|
| 4,182,383 A | 1/1980 | Admitis et al. | |
| 4,222,448 A * | 9/1980 | Sunkle | B01F 15/00194 177/1 |
| 4,434,467 A | 2/1984 | Scott | |
| 5,285,825 A | 2/1994 | Townsley | |
| 5,643,341 A | 7/1997 | Hirsch et al. | |

(Continued)

FOREIGN PATENT DOCUMENTS

| | | |
|---|---|---|
| DE | 19949033 A1 | 4/2001 |
| EP | 1817976 A1 | 2/2006 |

(Continued)

OTHER PUBLICATIONS

Merriam-Webster's Collegiate Dictionary, Tenth Edition, 1997, p. 459.

(Continued)

*Primary Examiner* — Marc C Howell
(74) *Attorney, Agent, or Firm* — SoCal IP Law Group LLP; Jonathan Pearce; Steven C. Sereboff

(57) ABSTRACT

There is disclosed a system for enabling dynamic mixture of hair colorant for individuals within a local retail establishment or salon. The system utilizes a dynamically-updatable database of hair colorant mixtures, based upon input data regarding natural hair color and current state to generate a suitable mixture. The same system and database can be used for subsequent refill orders from a remote manufacturing site. The remote manufacturing system operates in much the same way, but at a larger scale, and can be used for subsequent refill orders submitted online. Whichever system is used, the same user and colorant mixtures will be generated, and any updates or changes to the colorant mixture will appear on any system reliant upon the same database of colorant combinate instructions.

14 Claims, 9 Drawing Sheets

(56) References Cited

U.S. PATENT DOCUMENTS

| | | |
|---|---|---|
| 7,431,741 B2 | 10/2008 | Pasquier et al. |
| 7,711,610 B2 | 5/2010 | Iwaki et al. |
| 7,735,700 B2 | 6/2010 | Ruikka et al. |
| 7,877,294 B2 | 1/2011 | Inzinna, Jr. |
| 7,954,668 B2 | 6/2011 | Mehus et al. |
| 7,963,303 B2 | 6/2011 | Saranow et al. |
| 8,540,937 B2 | 9/2013 | Lark et al. |
| 8,577,750 B2 | 11/2013 | Mourad et al. |
| 8,830,467 B2 | 9/2014 | Igarashi |
| 9,102,509 B2 | 8/2015 | Buck et al. |
| 10,046,183 B2 | 8/2018 | Landa et al. |
| 2002/0042958 A1 | 4/2002 | Orr et al. |
| 2003/0149504 A1 | 8/2003 | Iwaki et al. |
| 2004/0163188 A1 | 8/2004 | Firkins et al. |
| 2004/0202686 A1 | 10/2004 | Welch |
| 2005/0036677 A1 | 2/2005 | Ladjevardi |
| 2005/0165705 A1 | 7/2005 | Lauper et al. |
| 2005/0228538 A1 | 10/2005 | Limburger |
| 2006/0036454 A1 | 2/2006 | Henderson |
| 2006/0265244 A1 | 11/2006 | Baumann |
| 2007/0180631 A1 | 8/2007 | Pasquier et al. |
| 2008/0178399 A1 | 7/2008 | Vena et al. |
| 2009/0076639 A1 | 3/2009 | Pak |
| 2009/0218007 A1 | 9/2009 | Saranow et al. |
| 2009/0248199 A1 * | 10/2009 | Milhorn .............. B01F 13/1055 700/239 |
| 2010/0088036 A1 | 4/2010 | Goddard-Clark et al. |
| 2011/0220139 A1 | 9/2011 | Samian |
| 2011/0313879 A1 | 12/2011 | Mourad et al. |
| 2018/0072555 A1 * | 3/2018 | Fortunato ............... G07F 13/06 |

FOREIGN PATENT DOCUMENTS

| | | |
|---|---|---|
| JP | 2009301514 A1 | 12/2009 |
| RU | 2308861 C1 | 10/2007 |

OTHER PUBLICATIONS

Anon., "Ultress Customized Hair Color Personalized Consumers Shade Adjustment," FDC Reports—The Rose Sheet, Apr. 19, 1999, p. 3.

Anon., "DrugEmproium.com Launches New Beauty Counter," PR Newswire, Jun. 1, 2000.

Anon., "Top Notes," WWD, Dec. 14, 2001, p. 8.

Kroll L., "Fresh Face, A," Forbes, vol. 170, No. 1, p. 66, Jul. 8, 2002.

Yap et al., "An adaptive immune algorithm based gravimetric fluid dispensing machine", Journal of King Saud University—Computer and Information Sciences, Revised Sep. 19, 2011, 9 total pages.

* cited by examiner

HAIR COLORANT DISPENSING SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the precise and repeat dispensing of hair coloration components for combination into hair dye based upon a dynamically updateable set of instructions.

Description of the Related Art

There exist many products for dying individual hair. The most common hair colorant systems rely upon user self-application, such as in-the-box hair colorants that are purchased at retail locations. The quality and customization/customizability of these products varies from low quality with virtually no customizability, to relatively high-quality with some customization available. One major limitation is the inability of an average use to customize his or her hair colorant. Another limitation of these types of self-application colorants is that shelf space and inventory management in a retail environment is always difficult. The more options one wishes to have available, the more shelf space is required. Often, retailers are not inclined to provide large amounts of shelf space, and stocks go out irregularly, so even when there is space available, popular colors may be missing.

In addition, the self-application colorants are traditionally simply a "color" that is shown in an image on the box. That color may not be particularly color-accurate to the dyes inside the box. Further, the color shown does not take into account the individual's current hair color and any other hair characteristics. As a result, the color shown on the box may not actually match the color that results when that dye is used, for example, on hair that is naturally red or naturally black, whether or not that individual bleaches his or her hair before application.

Within salons, more customization may be available. The actual colorant dyes themselves may be available, along with solution and activator. Even in these situations in which more customization might be available, hair stylists may lack sufficient skill and experience to actually mix variations of the dyes themselves. Stylists often rely upon predetermined mixes or combinations based upon instructions provided with the dye kits to perform the same functions as those of the self-application hair dyes. The results are often better, primarily because stylists have training in cosmetology and experience with the process. As a result, they are often better at managing the overall dying process, including taking into account the individual's underlying hair color.

At least one on-line system is available, operated by the assignee of this patent. Online systems can make available many more variations and mixtures, each depending upon a number of characteristics of an individual. These can include natural hair color, current hair color (e.g. bleached hair or previous dye applications and their timing), hair type (curly or straight), the amount of grey present in the hair, and other characteristics.

It may be beneficial in some cases to have a hybrid between the salon mixtures and online customization models. It can be helpful for some individuals to have the guidance of a cosmetologist as they select their desired hair color. Similarly, the cosmetologist may be assisted by a versatile hair colorant system that enables them to fine-tune a hair color selection in a user-friendly way. And, thereafter, it may be helpful to enable the individual to reorder the desired hair colorant on their own from any location they desire.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A system for generating custom combinations of hair colorant components, potentially including even the ammonia, alkaline solution, alkaline-free solution, and pigment components which typically make up hair colorant components (e.g. activator and solution), would be beneficial for addressing the shortcomings in the state of the art. It would be beneficial if the system guided a user (e.g. a stylist, or potentially an individual user) through selection of hair colorant, provided a fully-customized hair colorant virtually immediately, and provided a unique formula for that particular user's hair colorant with a unique identifier so that the same exact hair colorant could be reproduced at a later time.

As used herein, the word "formulation" means a set of instructions and hair colorant combinates in associated quantities for generating a desired hair colorant. As used herein, the word "recipe" means printed, computer-readable instructions that inform a computer how to create a hair colorant conforming to a particular formulation.

It would be still further beneficial if the same unique identifier could be used for subsequent purchases of hair colorant which could be reliant upon the same systems and processes in the same physical location or through an on-line order shipped directly to the user after an initial in-person purchase. It would be still further beneficial if changes to the formulation for creating that hair colorant could be dynamically updated, with those same changes reflected when ordering from any associated system in the field or with any large-scale manufacturing facility for both the in-person colorant purchases and the on-line ordered colorant purchases.

Description of Apparatus

Figure 1:
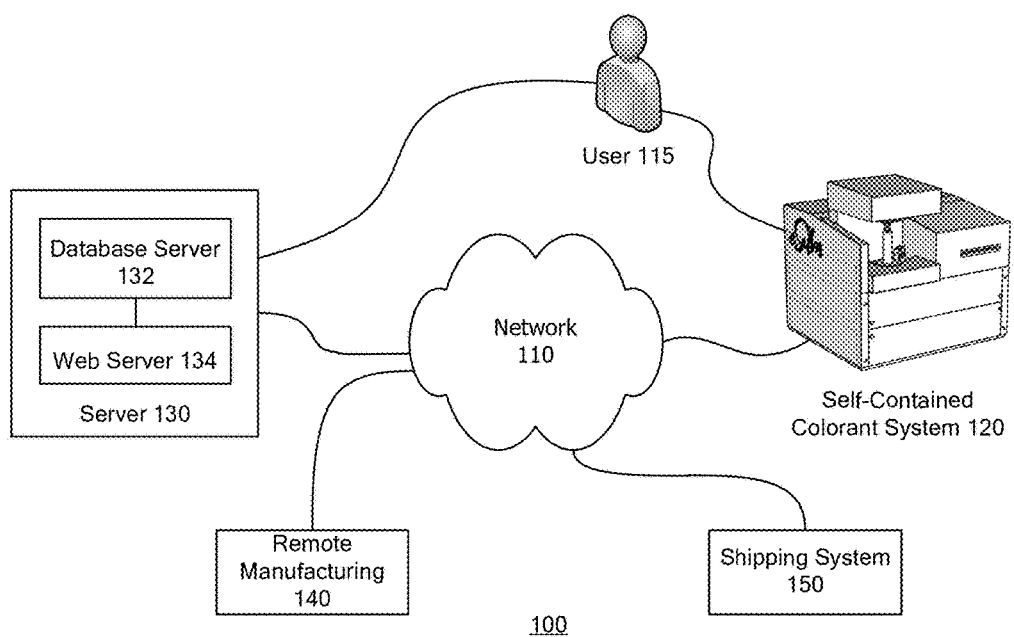
FIG. 1 is an overview of a system for hair colorant dispensing.

Referring now to FIG. 1, an overview of a system 100 for hair colorant dispensing is shown. The system 100 includes a self-contained colorant system 120, a server 130, remote manufacturing 140, and a shipping system 150, all interconnected by network 110. A user 115 is shown for illustrative purposes. The user 115 does not make up a part of the system 100, but may interact with the self-contained colorant system 120 and the server 130.

The self-contained colorant system 120 is a combination device including a computing device (FIG. 2) which may include or be joined with a display and user interface, several colorants or colorant components, a series of pumps and/or valves, tube heads for delivering hair colorant or hair colorant components to a container, and a printing device for generating container labels. Any display and/or user interface may be a part of the system 120 or may be provided as a separate device (e.g. an iPad® or other device) that may or may not directly communicate with the system 120. The self-contained colorant system is designed in such a way to allow it to be relatively easily set up in a retail location or a salon itself. It is also designed to have a user interface that is relatively user friendly so that any user may use the self-contained colorant system 120 to generate hair colorant to reach a desired color for their own hair. The self-contained colorant system 120 will be discussed more fully below.

For purposes of this patent, the phrase "hair colorant" means a ready-to-use dye mixture including an alkaline solution (or alkaline-free solution in some cases) and at least one pigment. Hair colorant typically also includes ammonia (or a similar ingredient), depending on whether the hair colorant is permanent or demi-permanent. Hair colorant may come in separate components (e.g. two bottles), one with the dye and the other with an activating ingredient. The hair colorant is already in a form where the pigment component is fixed within a diluent (e.g. water) in a known or fixed percentage so as to generate a desired coloration when applied to hair.

In contrast, a "hair colorant component" may be the individual components of a completed hair colorant in an unmixed form. These components may be individual pigments in a concentrate form, alkaline solution (or alkaline-free solution, in some cases), and ammonia in a concentrated form. A hair colorant component may be combined in known ratios with other hair colorant components (e.g. pigment, alkaline solution and ammonia) to create all or a portion of a hair colorant. One benefit of using hair colorant components, rather than already-fixed hair colorant in some cases, is that it allows for more precise customization of a computer-generated hair colorant. As a result, that hair colorant may be even more specific to an individual user than is possible using pre-mixed hair colorant.

A "hair colorant combinate" as used herein means one of the individual components of either a hair colorant (e.g. pigment and alkaline solution combined in known ratios) or of a hair colorant component (e.g. the concentrate pigment or water in not-yet-fixed ratios). Hair colorant combinate is, therefore, a generic to a component of either a hair colorant component or hair colorant. Where any distinction between the two is relevant, it will be called out in the discussion below.

The server 130 includes a database server 132 in addition to a web server 134. The server 130 may in fact be many servers or computers running in the cloud or in various locations in order to better serve customers. The server 130 may include components other than the database server 132 and the web server 134, but these components are mentioned specifically because they bear on the discussion herein.

The database server 132 is a database of users, user characteristics (e.g. natural hair color, current hair color, age, past hair colorant orders, desired hair color, and other characteristics), hair colorant mixtures and ingredients, and the instructions for creating completed hair colorants from hair color combinates. From time to time, as discussed further below, the database server 132 may be updated with new information about users' characteristics, or with new ingredients or new instructions for creating hair colorant. That update may take place based upon the introduction of new pigments, new information about the results of increased or lower concentrations of pigments relative to other components of hair colorants, or as more precise calibration becomes available. The database server 132 is described as a database but may have dynamic elements as well. For example, given a set of available pigments with known characteristics (e.g. concentrations), the database server 132 may be capable of calculating appropriate volume combinations for reaching numerous desired color combinations. That information may be stored, in a traditional sense, within a database architecture, or may instead operate as an algorithm for generating hair colorant or hair colorant components from hair colorant combinates.

The web server 134 is, most likely, a typical web server serving web pages. However, the web server 134 is also representative of an API (application programming interface) front-end to a mobile application that may operate on a mobile device, a tablet computer, a desktop or laptop computer, or that may operate on a computing device fixed to or integrated with the self-contained colorant system 120. In most cases, such a computing device will be an off-the-shelf tablet computer such as an Apple® iPad®. However, a custom, integrated computing device may be valuable in the future. A well-tuned camera, for example, may be used to detect current hair color for a user. Such a camera may only be available through the integration of a custom computing device into the self-contained colorant system 120.

The web server 134 enables access to the data stored in the database server 132 to the self-contained colorant system 120, the remote manufacturing 140, the shipping system 150 and, likely, to the user 115 through the use of his or her own mobile device or computing device web browser, via the network 110. The web server 134 enables a user to input information related to his or her hair and desired hair color, and to receive information back regarding a proposed hair colorant to be created by the self-contained colorant system 120 or the remote manufacturing 140. The web server 134 may also interface with the self-contained colorant system 120 and remote manufacturing 140 to periodically update, either in a push or pull system, information related to instructions for making a particular hair colorant to reach a desired hair color.

The remote manufacturing 140 is representative of a physical location where large-scale production of hair colorant takes place. The remote manufacturing 140 may merely be several self-contained colorant systems 120 working in concert to handle multiple orders from, for example, online purchasers of hair colorant who may or may not have previously purchased hair colorant using a self-contained colorant system 120. Practically, the remote manufacturing 140 operates in an identical manner to the self-contained colorant system 120, merely at a larger scale. This enables the backend systems (e.g. database server 132, web server 134) to operate in the same fashion for both the remote manufacturing 140 and the self-contained colorant system 120.

The remote manufacturing 140 may be a central location or one of several central locations from which online orders for hair colorant are supplied. This may be a traditional "assembly line" type location with large stores of hair colorant combinates, many containers, multiple printers, and shipping facilities. Importantly, the remote manufacturing 140 is generally designed to utilize the same database server 132 when creating hair colorant that is used by the self-contained colorant system 120. The remote manufacturing is primarily intended to service a user 115 following a use of the self-contained colorant system 120 or for direct-to-consumer online orders using the web server 134.

The shipping system 150 may be a shipping computing device or devices and printer(s) that interact with the database server 132 to handle online requests for hair colorant and to ship those hair colorants created by the remote manufacturing 140, either as initial orders or reorders to the user 115. The shipping system 150 is shown as distinct in FIG. 1, but may merely be a component of the remote manufacturing 140 or may be in communication with the remote manufacturing 140.

The network 110 may be or include the Internet, but generally has an interconnection between the other components of the system 100 that enables communication between them for the sharing of data, such as user characteristics and instructions for creating hair colorant stored in the database server 132.

Figure 2:
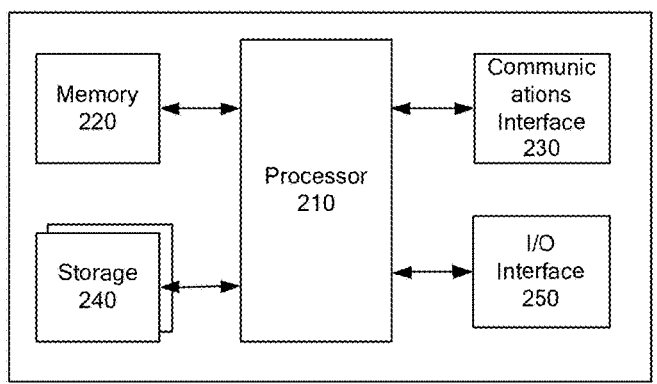
FIG. 2 is a block diagram of a computing device.

FIG. 2 is a block diagram of an exemplary computing device 200, which may be a part of the self-contained colorant system 120 or the server 130 of FIG. 1. As shown in FIG. 2, the computing device 200 includes a processor 210, memory 220, a network interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the communications interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices.

Figure 3:
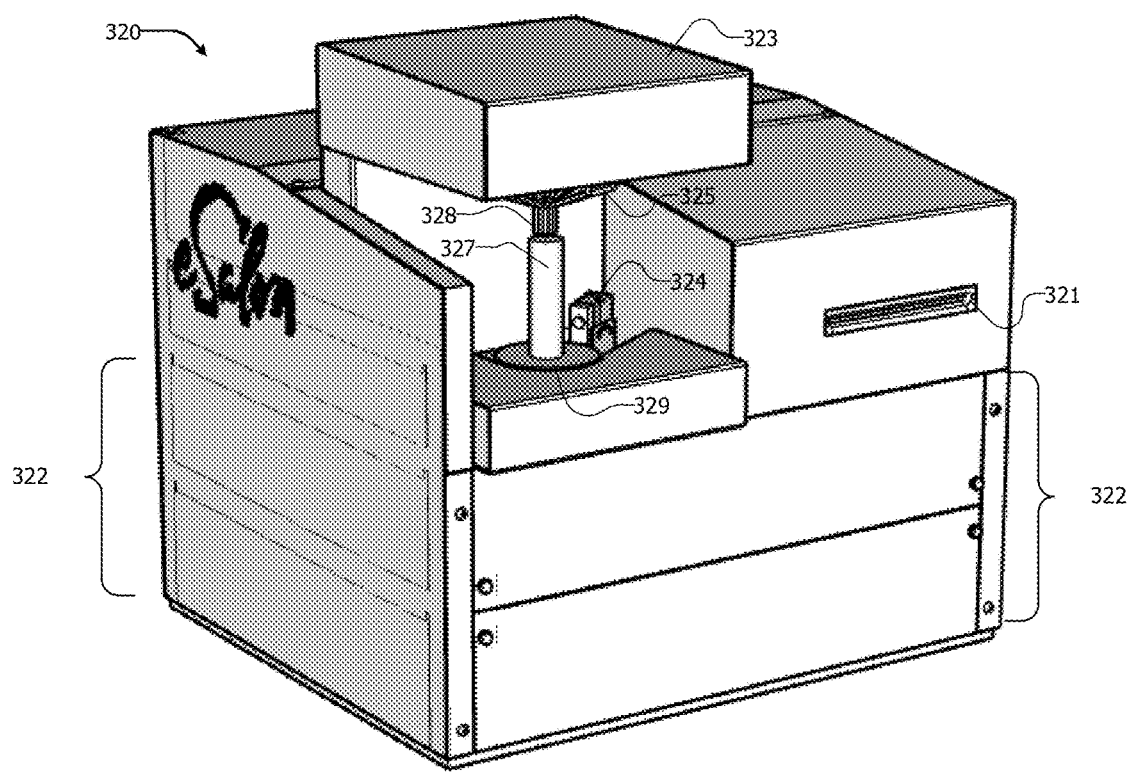
FIG. 3 is a top, perspective view of a self-contained colorant system.

FIG. 3 is a top, perspective view of a self-contained colorant system 320. The self-contained colorant system 320 includes a printer 321 (only the output tray of the printer 321 is visible in FIG. 3), a series of removable panels 322, a dispenser cover 323, an optical scanner 324, a series of tubes 325, a container 327, a nozzle 328, and a high-precision scale 329. The self-contained colorant system 320 is shown as merely exemplary. The actual shape and appearance of the self-contained colorant system 320 is largely irrelevant, so long as all or the majority of the components are included in some form.

The printer 321 is in communication with an associated computing device that is used to operate or control the printer 321. The computing device may be, in whole or in part, integrated with the self-contained colorant system 320, or the computing device may be stand-alone (e.g. an iPad®). The printer 321 is used to output labels for the container 327. The labels may provide information related to the purchaser (e.g. name or purchase date) or information regarding application (e.g. instructions on how to properly apply the hair colorant). However, each label incorporates one or more optically-readable or machine-readable images that provide a specific recipe for the hair colorant combinates that make up a hair colorant, and the process by which the self-contained colorant system 320 is to generate the desired hair colorant. This recipe can include preferred weights of each hair colorant combinate (preferably absolute weights for each combinate, but may also be expressed as ratios), a volume measurements for each hair colorant combinate, and/or the order in which the hair colorant combinates are to be added to the hair colorant. Though weight is the preferred method reliant upon the high-precision scale 329 (discussed below), a preferred volume could also be used instead.

The removable panels 322 enable ease of servicing the self-contained colorant system 320. In particular, though not shown in this image, the hair colorant combinate reservoirs are within the lower chambers of the self-contained colorant system 320 behind the removable panels 322. Making the panels 322 easily removable makes the process of replacing the reservoirs easier and faster for service technicians or laypeople operating the self-contained colorant system 320. As indicated above, the particular form of the panels 322 may vary from that shown in FIG. 3.

The dispenser cover 323 is aesthetic and protective of the series of tubes 325 that come to the nozzle 328. It shields from view the tubes 325 as they come out of the lower portion of the self-contained colorant system 320 and protects them from bending or other damage.

The optical scanner 324 is preferably a laser scanner capable of reading barcodes (similar to those in supermarkets). However, the scanner may be or include a digital or infrared camera. Various optical scanners and cameras are known in the art for capturing and reading barcodes, QR codes, or other forms of computer-readable images. As indicated above, the barcode or similar aspect of the label printed by the printer 321 includes a recipe for how to operate the self-contained colorant system 320 to create a desired hair colorant (e.g. the weights and/or volumes of each combinate pour). Though described as an optical scanner 324, other systems may rely upon a radio frequency identification (RFID) code and printer, near field communications (NFC) and an associated NFC scanner, or other, similar physical data transmission technologies.

The series of tubes 325 extend from the hair colorant combinate reservoirs to the nozzle 328. As will be discussed below, the tubes 325 connect to pumps that control the flow of each hair colorant combinate and the amount of each hair colorant combinate as it is added to the container 327. These are described as pumps herein for the self-contained colorant system 320. However, the hair colorant combinates may be pressurized or controlled through gravity to pour through the tubes 325 at a relatively stable rate by merely opening up associated valves. In such cases, pumps may not be required, and valves may be used instead. The phrase "flow control mechanism" means valves or pumps, as described herein.

The container 327 is most typically a vial or a similar glass or plastic bottle. Preferably, the container 327 includes a substantially uniform side so that the label printed by printer 321 can be affixed thereto for reading by the optical scanner 324. The container 327 is not necessarily a part of the system 320, but is used by the system to be read (once a label is affixed) and into which to pour the hair colorant combinates.

The nozzle 328 is a joining of the series of tubes 325. The nozzle 328 may be effectively a funnel into which each of the series of tubes 325 pours, or may merely be a coming together of the ends of the series of tubes 325. It has generally been found that when extremely tight control is to be maintained over the volumes of each hair colorant combinate added to the container 327, the use of a combination funnel-like system is less desirable than the individual tubes. That way, there is no intermixing of colors that dilute or alter the color outside of the control of the self-contained colorant system 320, and there are no "left over" hair colorant combinates from previous pours in the funnel portion. Therefore, the individual tubes themselves are generally maintained separately all the way to the dispensing into the container 327.

The high-precision scale 329 is highly precise in at least two senses. First, it must be highly accurate. Generally, the total volume of the finished hair colorant is less than 2 ounces in weight. The ratios for the hair colorant combinates are typically on the order of fractions of ounces. Preferably, the high-precision scale 329 is accurate to at least 0.01 ounce. While accounting for cost associated with high-precision equipment and with potential calibration issues, the accuracy is preferably even higher. Second, the high-precision scale 329 must be extremely fast updating. The total pour time for, for example, 2 ounces of liquid using the pumps currently envisioned is less than 60 seconds. Many smaller, digital scales are very accurate, but require stillness of the subject weight or sample for one or two seconds before an accurate reading can take place. That is unacceptably slow in the present context. This is all the more exaggerated in the larger scale production of the remote manufacturing 140 where tens or hundreds of bottles of hair colorant may be created in minutes. The high-precision scale 329 must be highly accurate, very quickly as the hair colorant combinates are being added to the container 327. The reading preferably dynamically updates at least ten times a second. Since the high-precision scale 329 is digital, those output readings of weight can be read by the computing device which instructs the pumps to turn on and turn off to begin or end sending hair colorant combinates through the series of tubes 325 to the container 327. In this way, the high-precision scale 329 acts as a check on the accuracy of the resulting hair colorant mixtures. The pumps act as an initial check based upon at least a basic understanding of their throughput when on and how quickly they react when shut off, which may be ascertained through calibration. The pumps can be carefully controlled and calibrated, and the high-precision scale can double-check the results of the calibrated pumps. There may be a slight delay in measurement by the scale, after pumping, to ensure that the scale does not register the input from the nozzle 328 as extra weight.

Figure 4:
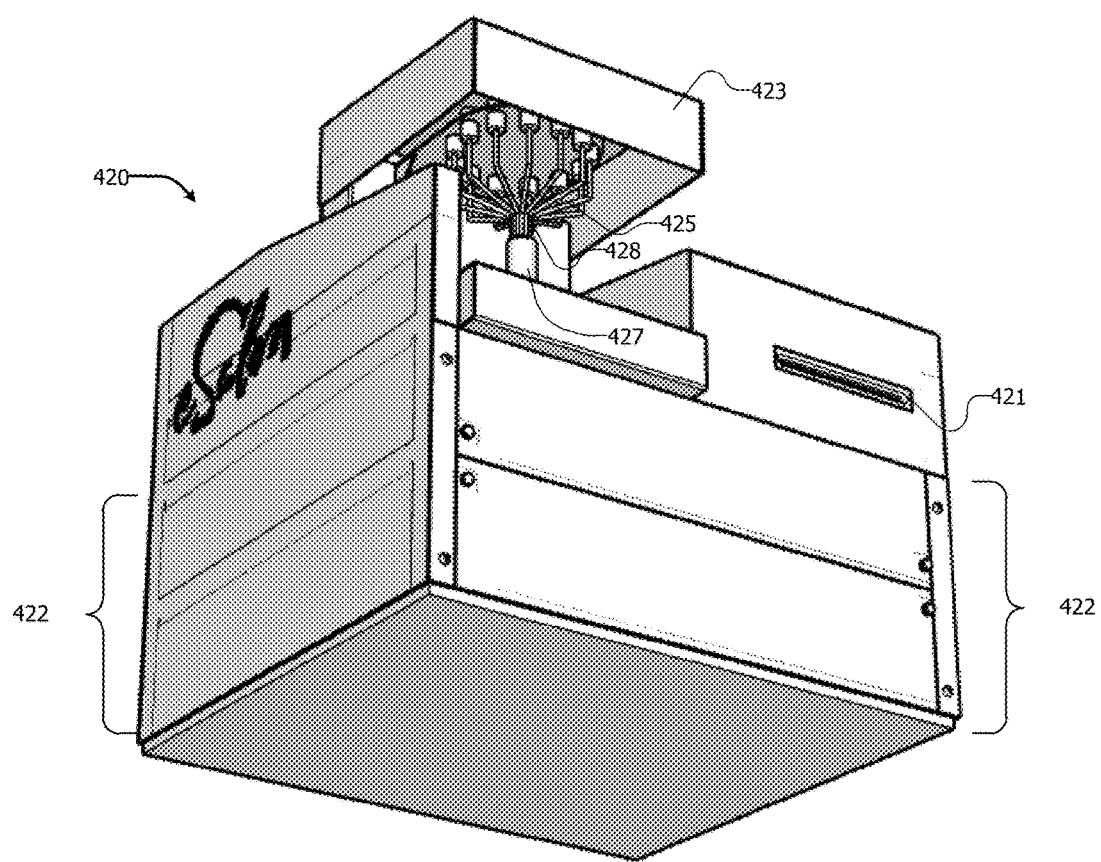
FIG. 4 is a bottom, perspective view of a self-contained colorant system.

FIG. 4 is a bottom, perspective view of a self-contained colorant system 420. This view is provided primarily to provide a better view of the set of tubes 425. The remaining components remain the same as shown in FIG. 3. The printer 421, the removable panels 422, the dispenser cover 423, the nozzle 428, and the container 427 are all the same as in FIG. 3. Their description will not be repeated here.

Figure 5:
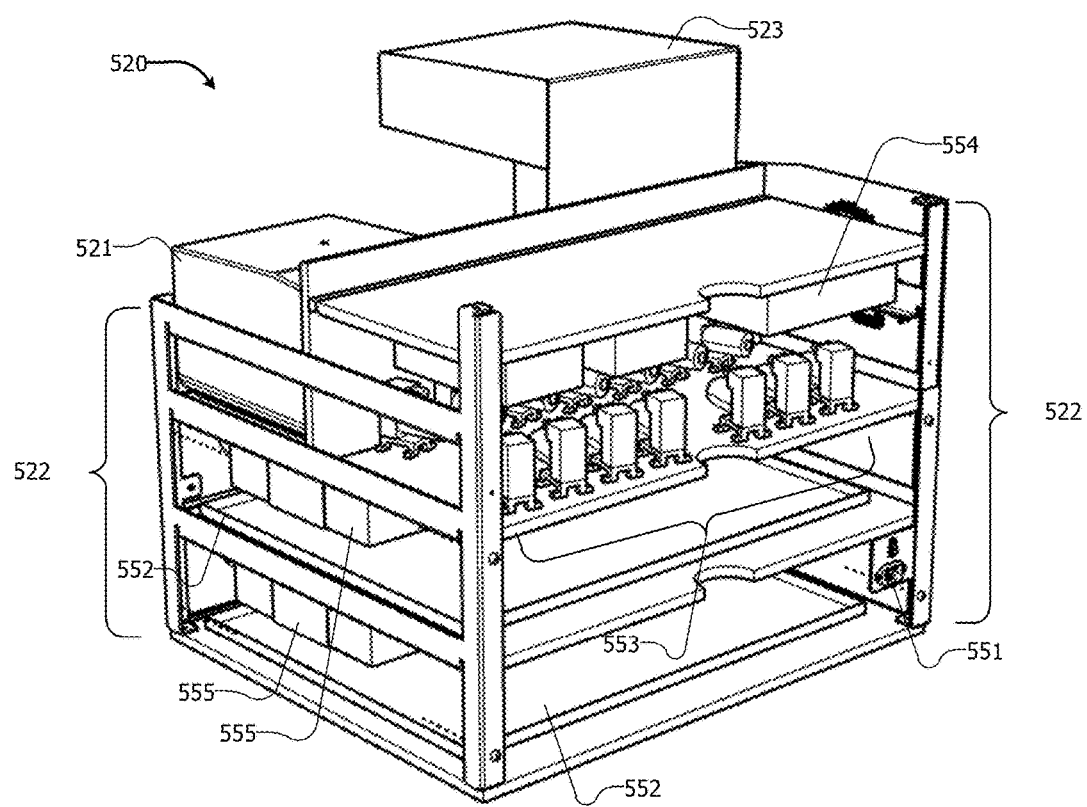
FIG. 5 is a cut-away top, perspective view of a self-contained colorant system.

FIG. 5 is a cut-away top, perspective view of a self-contained colorant system 520. This is the same system 520 as in FIGS. 3 and 4. However, this is a cut-away view with the removable panels 522 removed to show the interior of the system 520. In general, the elements described above with reference to FIG. 4 should be assumed to have the same function. That description will not be repeated here. The printer 521 is more visible now as an independent label printer as seen from the back. The dispenser cover 523 remains in place.

The power connector 551 is where a connector to join the self-contained colorant system 520 to an electrical outlet is fixed. This is a power connector 551 rather than a power supply because it acts only as a connector. The power supply preferably is attached to the bottom of the top panel near computing device 554. This is intentional because the hair colorant combinate reservoirs 555 typically store liquid combinates. The computing device 554 and pumps 553, as well as the power supply (not numbered) are intentionally above the liquid reservoirs 555 so that any leaks will not damage those components.

There are also drip trays 552 included at each level immediately below the reservoirs 555 to ensure that any leaks are caught before dripping onto a countertop or table on which the system 520 is set.

The pumps 553 may be calibrated and preferably move liquid at a known, slow but steady pace to enable even pours and to assist the high-precision scale 329 in measuring the hair color combinates as they are added to the container 327. The calibration may, in part, rely upon use of the scale. The electricity provided to the pumps 553 may be altered slightly to reduce or increase the rate of flow. Alternatively, the pumps 553 may be quickly closed as the end of particular pours are reached, the resulting pour may be measured by the high-precision scale, then the pumps may be engaged and quickly disengaged again to add a little additional to the mixture as needed. In either option, the rate of flow and throughput may be precisely known by the computing device 554 as it operates in accordance with instructions for creating hair colorant. Preferably, there is one pump per reservoir 555 and one tube of the set of tubes 325.

The computing device 554 is preferably a custom-designed system on a chip in combination with a power supply. The computing device 554 may be limited to operating the pumps in response to the recipe on a printed label, enabling operation of the optical scanner 324, and reacting to digital information provided by the high-precision scale 329. At a minimum, the computing device 554 performs those functions. In addition, the computing device 554 may be or include a display on the system 520 to enable individuals to interact with the system 520 and with the database server 132 to select a particular hair color, input individual characteristics, and otherwise begin and complete the process of creating hair colorant. As discussed above, the computing device 554 may be or include a mobile device, a tablet computer, a desktop computer, or other component. But, preferably, the computing device 554 for operating the pumps 553, scale 329, and optical scanner 324 is integrated into the system 520 and may merely communicate with another external computer to perform some functions.

The reservoirs 555 are a series of storage reservoirs for hair colorant combinates. The reservoirs are preferably a single combinate and are preferably designed in such a way that when one is removed, there is physical guidance that ensures that replacement of that reservoir is by the same type or kind of combinate. One example of such a design would be to include physical projections extending outward toward a reservoir 555 base as it is inserted. Corresponding insets may be provided in the base of the reservoir 555 such that only a reservoir of the appropriate type may "fit" within the slot. Other cutouts, or conductive materials, or computer chips have also been used to enable a "check" on whether the appropriate reservoir 555 is in the appropriate slot. This helps to ensure that technicians have put the appropriate hair colorant combinate in the appropriate location so that the overall system 520 functions as intended to create the hair colorant desired by each user.

The reservoirs 555 are each connected to one of the set of tubes 325 and to one of the pumps 553 to enable hair colorant combinates to be transferred from the reservoirs 555 in amounts intended and weighed by the high precision scale 329.

Figure 6:
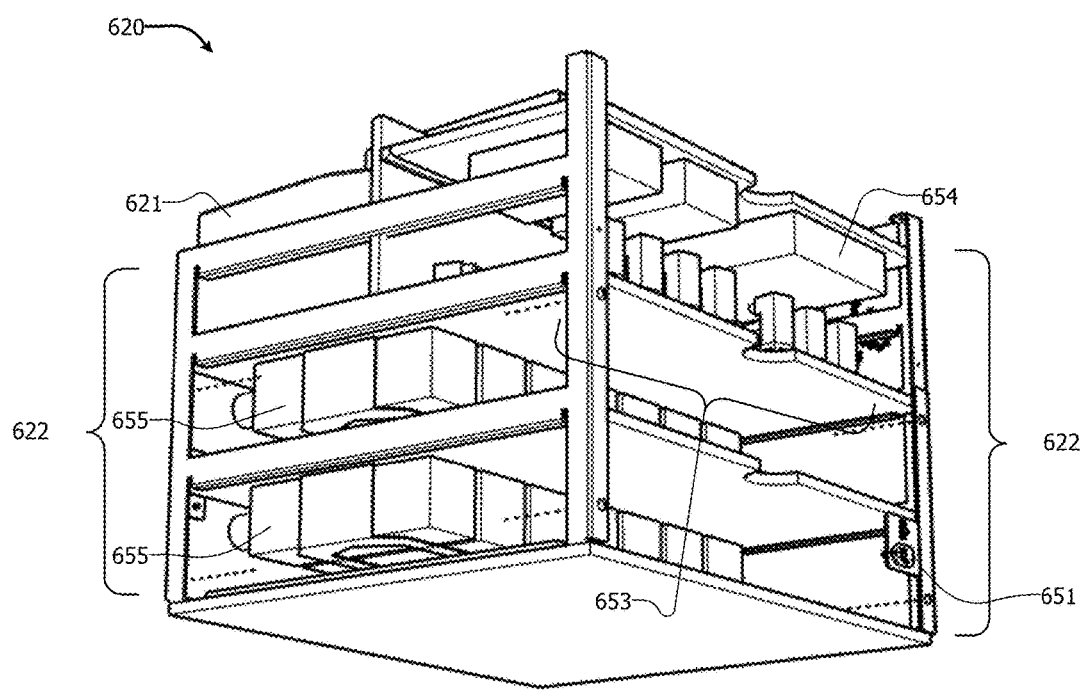
FIG. 6 is a cut-away bottom, perspective view of a self-contained colorant system.

FIG. 6 is a cut-away bottom, perspective view of a self-contained colorant system 620. The components here are identical to those in FIG. 5, but some components may be seen more clearly from this view. Here the reservoirs 655 may be seen more clearly, each in its own slot. The computing device 654 may also be seen. It may be housed within a protective housing. The pumps 653 can also be seen from a different angle. The removable panels 622 are still removed for viewing with the printer 621 still visible as well.

Description of Processes

Figure 7:
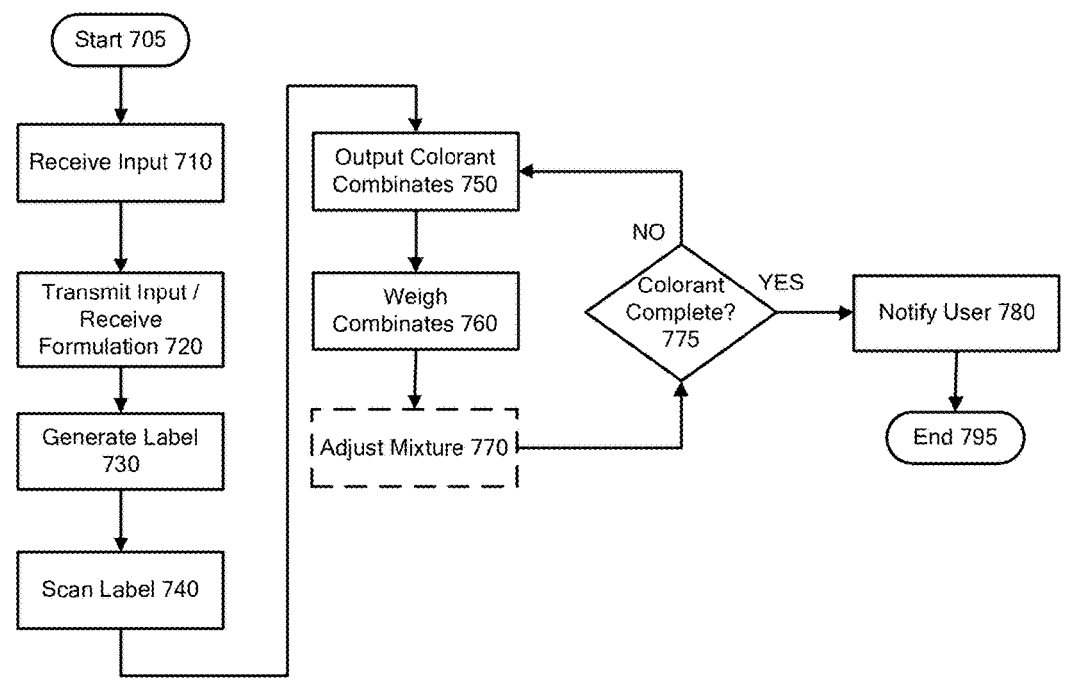
FIG. 7 is a flowchart of a process of using a self-contained colorant system to create a hair colorant.

FIG. 7 is a flowchart of a process of using a self-contained colorant system to create a hair colorant. The flow chart has both a start 705 and an end 795, but the process is cyclical in nature and may repeat for each customer or each hair colorant ordered. Though the process is described with reference to the self-contained colorant system (e.g. 120 in FIG. 1), it may be equally applicable to the remote manufacturing (e.g. 140 in FIG. 1).

Following the start 705, the process begins with the receipt of input 710 from a user. This input may be as simple as logging into an account or inputting a previous order number or hair colorant unique identifier. Such an input may automatically load up a desired hair colorant for the self-contained colorant system to create. Alternatively, this input may begin with a user inputting their characteristics, creating a login account with the overall system, and selecting from available hair colorants based upon that user's desires. This process may begin on, for example, an iPad connected to the self-contained colorant system 120, and may involve interaction with the database server 132 to process characteristics and other variables and to output a selected hair colorant creation formulation.

In response to that input, whatever form it may take, the self-contained colorant system may transmit the information to a server (e.g. database server 132 in FIG. 1) to obtain an appropriate formulation. A formulation may not be fixed. In some cases, a formulation may be dynamic, automatically generated based upon the inputs provided by a user.

A single set of storage, for example, the database server 132, may store the formulations for use by the system 120 in making hair colorants. Though described as a single storage or database server 132, the system may be spread across multiple physical machines in multiple locations to better, more redundantly, and more quickly serve the various self-contained colorant systems and remote manufacturing. The appropriate formulation may be transmitted to and received by the self-contained colorant system (or remote manufacturing) shortly after receipt of the input at 720.

Once the formulation is received at 720, the self-contained colorant system may generate a label at 730 (e.g., an adhesive label). As discussed above, the label may include various things such as the person's name, address, shipping information, instructions for application of the hair colorant, or other information. The label will at least include the recipe for creation of the hair colorant in a computer-readable form. This may be a barcode, a QR code, an RFID label, or other forms of machine-readable information transmission. The barcode may actually be the recipe (e.g. 15% of ammonia, 3% pigment #1, 3% pigment #2, 3% pigment #3, and 66% alkaline solution; with a total weight of 2.0 ounces) or may instead be a reference to the formulation which is stored in the database server 132 (e.g. an indication to access formulation for Red #53). Preferably, the recipe is the former because then no further network interactions are required and the self-contained colorant system 320 can operate based upon the label itself.

The self-contained colorant system 320 can then scan the label 740 after it has been affixed to the exterior of the container. The label scanning process uses the optical scanner 324 to read the machine-readable label. In cases in which the actual recipe for how to create a chosen hair colorant is printed on the machine-readable label itself, the computing device 554 within the self-contained colorant system 320 may operate the pumps 555 and high-precision scale 329 to follow that recipe provided on the label. Otherwise, an intermediate step for accessing the formulation online may be required first.

The various colorant combinates may be output at 750. This involves the computing device 554 instructing one of the pumps 553 to output a particular combinate in the amount indicated by the recipe on the label (e.g. 15% or 0.30 ounces). Substantially simultaneously, the combinates are weighed at 760. Though shown as two distinct steps, these two steps actually take place substantially simultaneously with the operation of the pumps and the weighing both informing the computing device 554 as to the accuracy of the overall pour of a given combinate.

At 770, the mixture may optionally be adjusted if there was any overpour or underpour detected. At this step, the system may account for an overpour or underpour by automatically adjusting the overall mixture to maintain appropriate ratios of the combinates. If the high-precision scale 329 and pumps 553 are operating well, this is unlikely to occur, but this is a final quality control check on the hair colorant.

Next, a determination whether the colorant is complete is made at 775. If not ("no" at 765") then the process continues with outputting of colorant combinates 750, weighing those combinates at 760 and adjusting the mixture at 770 (if necessary). This continues until all of the hair color combinates are added in appropriate volumes for the desired hair colorant.

If the colorant is complete ("yes" at 775"), then the user is notified that process is complete at 780. This notification may be visible on the associated computing device (e.g. computing device 554) through a set of LEDs or display or may be visible on an external device such as an iPad® or may be an email, text message, push notification or similar notification to a mobile device associated with the requesting user. Alternatively, the notification may be a noise or movement of the container 327 toward a requesting individual or out of the area where the pour takes place. He or she may pick up the container 327 into which the hair colorant has been dispensed.

The process then ends at 795.

Figure 8:
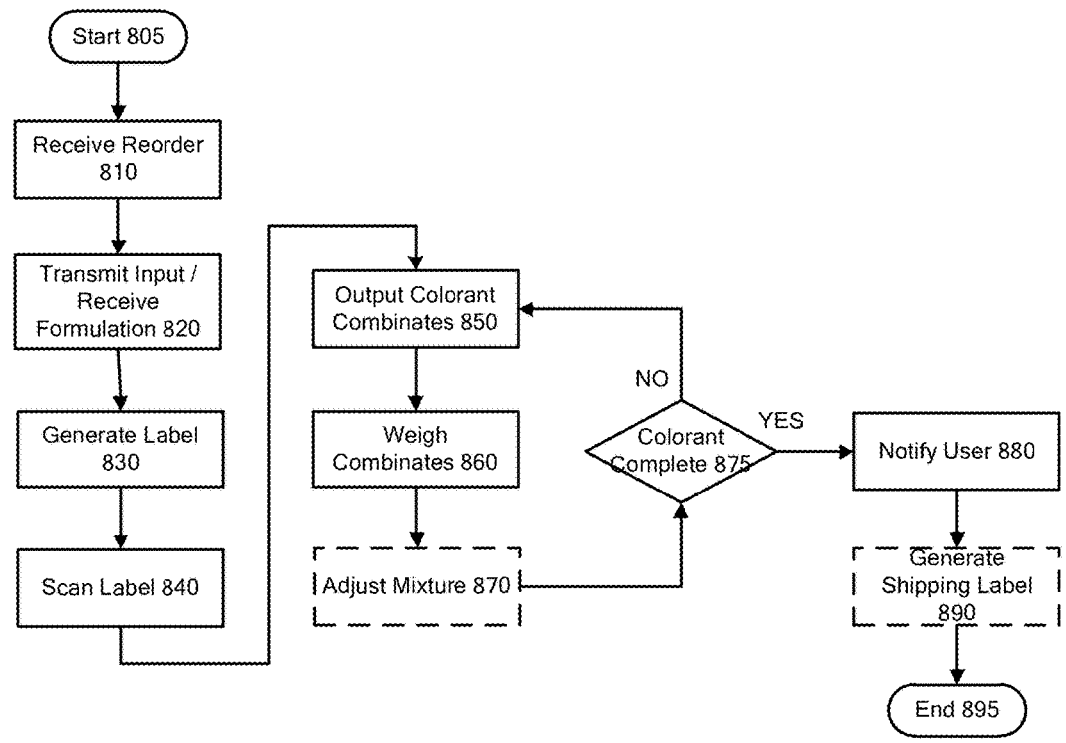
FIG. 8 is a flowchart of a process of reordering hair colorant.

FIG. 8 is a flowchart of a process of reordering hair colorant. This process begins at 805 and ends at 895, but also may take place many times over, and many times substantially simultaneously for multiple users via, for example, the internet. This process may most commonly take place over the internet at remote manufacturing 140 (FIG. 1), but may also take place at the same or another self-contained colorant system 120 (FIG. 1). Because both systems may be used, the process is identical for both systems and is quite similar to the initial order process because the processes and associated systems are similar. They rely upon the same computer systems, the same scales, the same containers, the same flow control mechanisms, same controllers, and the same set of instructions. In this way, the system may be as standardized whether the user is at a self-contained colorant system or reordering online from remote manufacturing. Because the processes are similar, the description provided for FIG. 7 will not be repeated here unless there are distinctions to draw between the two Following the start 805, a reorder request is received at 810. As indicated above, this may be a login for a particular user, a unique identification of a particular hair colorant, or some other process for initiating a re-order. Notably, unless the user desires a change to his or her hair color, this process typically would not include input of user characteristics or other information that influences hair color selection because that information would be retained from the prior order.

Thereafter, the process is identical to that of FIG. 7 from steps 820 to decision 875. It should be noted that the formulation for a particular hair colorant may change between an earlier order and a subsequent order. Thus, the transmission and receipt of a formulation that is output as a label at 830 may involve a different recipe, even for the same hair colorant, than was present at the time of an earlier order. That update process is described with reference to FIG. 9 below.

The manufacturing process that takes place at remote manufacturing 140 may actually be much more like an assembly line system, but the process likewise includes the label generation, optical scanning, and measured pouring along with weighing that is used for the self-contained colorant system 320 and the remote manufacturing 140 (FIG. 1). The process is likewise identical for a reorder at a self-contained colorant system 320.

Once the colorant is complete ("yes" at 875), then the user is notified at 880. This notification may be an on-screen popup for in-person orders at a self-contained colorant system or may be an email or text message for users of remote manufacturing system. As discussed above, other notification options are possible including LED lights, sounds, network-based notifications, or movement of an associated container.

Next, if the order is not in-person, a shipping label may be generated at 890. This may be created from user data stored in the database server 132. Then the container 327 may be shipped to the user via the mail.

Figure 9:
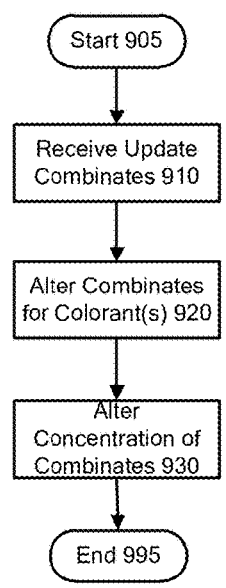
FIG. 9 is a flowchart of an update process for updating hair colorant creation instructions.

FIG. 9 is a flowchart of an update process for updating hair colorant creation formulation. The update process begins at 905 and ends at 995 but may take place many times over time given that hair colorant formulations may change over time as new information comes to light, as different ingredients or base components are used, or as feedback from users is received.

Notably, previous colorant creation formulations may be updated to better match the intended colors. For example, user feedback may indicate that a particular colorant is "redder" than desired or expected. As a result, over time, that hair colorant formulation may be revised to create a hair colorant with less red pigment. The formulation for creating that hair colorant may be revised to require less of that red pigment hair color combinate.

Alternatively, as indicated above, the hair colorant combinates may be either pigments in an alkaline mixture (or alkaline free in some cases) and/or ammonia (or ammonia substitute) ready for activation or may be the individual components of a hair colorant. The former are sold on the market by a few chemical corporations who perform all of the pre-mixing of the components. The benefit of this is that the mixtures and their properties are well-known, so their combinations and the results of their combinations are well tested and proven. As a result, the combination is relatively straightforward. One downside to these pre-mixed hair colorants is that there are fewer overall options for variability in the hair colorant. The separation of the pigments from the diluents, alkaline solution (or alkaline free solutions in some cases), and ammonia (or an ammonia substitute) into constituent parts allows for much more precise control over the resulting hair colorants. This is especially true in cases in which the system 320 or remote manufacturing 140 will create hair colorant from those individual constituent components.

In those cases, the formulation for creating a hair colorant may alter due to changes in the combination of the constituent components. However, the formulation for creating a particular hair colorant may also change based upon the introduction of new pigments or chemical constituent parts, or there no longer being a particular pigment or constituent part available. In such cases, the formulations must be updated to accommodate the new or lost combinates. The ability to update the formulation for creating a particular hair colorant is particularly valuable in such cases because continued or repeated creation of the same (or as near-as-same a hair colorant as possible) is strongly preferred to maintain happy customers.

After the start at 905, updated combinates are received at 910. This may be through the introduction of a new pigment or through the discontinuing of a hair color combinate and the necessity to rely upon a different formulation involving another, existing combinate. In either case, this update combinate may be received from a system administrator or chemical specialist responsible for formulations, from an automated process, or from some other authorized source.

In response to the updated combinates received at 910, the combinates for a given hair colorant may have to be altered at 920. This alteration is to the instructions for creating the hair colorant itself. This may mean adding or increasing some pigments, decreasing or removing others.

Next, the concentration of each combinate may be altered at 930 by increasing or decreasing the relative amount of each pigment, alkaline solution (or alkaline free solution in some cases), ammonia (or ammonia substitute), or other, similar changes. The concentration may be expressed as a ratio (e.g. 50% pigment blend, 50% alkaline solution) to enable the system to dynamically alter the formulation as needed (for example in the case of overpours). Alternatively, it may be expressed as absolute amounts (e.g. 1 oz pigment blend, 1 oz alkaline solution).

The alterations at 920 and/or 930 occur on a central system. In some cases, a single server (e.g. server 130) may be the place where the formulations are updated. In other cases, there may be multiple servers spread throughout the world for redundancy or speed of access by users, that each are provided with updated formulations to match the changes made at a central server.

Then the process can end at 995.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for mixing hair colorant, the system comprising a single hair colorant dispenser, comprising:
    a high-precision scale for weighing hair colorant combinates as they are added to a colorant combination;
    a series of computer-controlled flow control mechanisms for releasing hair colorant combinates as directed by a first computing device; and
    a machine-readable label printer for outputting printed labels including a recipe to create hair colorant at the direction of the first computing device;
    a machine-readable language scanner for scanning a machine-readable label incorporating the recipe at the direction of the first computing device;
    the first computing device, including a processor and memory, for
        receiving a reorder request for the selected hair colorant,
        directing the machine-readable label printer to output a machine-readable label including the recipe to create a selected hair colorant;
        directing the machine-readable language scanner to read the recipe on the machine-readable label;
        operating the series of flow control mechanisms in response to data from the high-precision scale to accurately measure an amount of each of the hair colorant combinates while disengaging and engaging at least one of the series of flow control mechanisms to release at least one of the hair colorant combinates in an amount directed by the recipe printed on the machine-readable label to create the selected hair colorant.

2. The system of claim 1 wherein the high-precision scale is configured to confirm that each of the hair colorant combinates is added to the selected hair colorant in the amount required by the recipe.

3. The system of claim 1, wherein the hair colorant dispenser further comprises an independent user interface device for:
    enabling a user to select a desired hair color; and
    requesting a formulation associated with the selected hair colorant to reach the desired hair color from a remote server.

4. The system of claim 3 wherein the machine-readable label printer is further for:
    accessing the formulation for the selected hair colorant; and
    outputting the formulation for the selected hair colorant as the recipe on the machine-readable label.

5. The system of claim 1 further comprising a second system, remote from the hair colorant dispenser, for mixing hair colorant, the second system comprising:

a communications interface for receiving reorder requests;
a second high-precision scale for weighing hair colorant combinates as they are added to the colorant combination;
a second series of computer-controlled flow control mechanisms for releasing hair colorant combinates as directed by a second computing device;
a second machine-readable label printer for outputting printed labels for hair colorant containers;
a second machine-readable language scanner for scanning a second machine-readable label incorporating the recipe at the direction of the second computing device; and
the second computing device, including a second processor and a second memory, for
receiving, through a communications interface, a reorder request over a network for the selected hair colorant, the reorder request including the recipe;
directing the machine readable label printer to output a second machine-readable label including the recipe to create the selected hair colorant;
directing the second machine-readable language scanner to read the recipe on the second machine-readable label;
operating the second series of flow control mechanisms in response to data from the second high-precision scale to accurately measure an amount of each of the hair colorant combinates while disengaging and engaging at least one of the second series of flow control mechanisms to release at least one of the hair colorant combinates in an amount directed by the recipe printed on the machine-readable label to recreate the selected hair colorant.

6. The system of claim 5 wherein the recipe for the selected hair colorant changes between operation of the hair colorant dispenser and the second system for mixing hair colorant.

7. The system of claim 5, wherein the second system further comprises a second independent user interface device for:
enabling a user to identify the selected hair colorant based upon a prior order; and
requesting the formulation associated with the prior order from the remote server.

8. Apparatus comprising non-volatile memory storing a program having instructions which when executed by a processor will cause the processor to:
generate a machine-readable label including a recipe for a selected hair colorant;
scan the machine-readable label incorporating the recipe for the selected hair colorant; and
operate a series of flow control mechanisms in response to data from a high-precision scale to accurately measure an amount of each of a series of hair colorant combinates while disengage and engage at least one of the series of flow control mechanisms to release at least one of the series of hair colorant combinates in an amount directed by the recipe printed on the machine-readable label for the selected hair colorant.

9. The apparatus of claim 8 wherein the high-precision scale is configured to confirm that each of the hair colorant combinates is added to the selected hair colorant in the amount required by the recipe.

10. The apparatus of claim 8 wherein the instructions further cause the processor to:
enable a user to select a desired hair color; and
request a formulation associated with the selected hair colorant to reach the desired hair color from a remote server.

11. The apparatus of claim 10 wherein the instructions further cause the processor to:
access the formulation for the selected hair colorant; and
output the formulation for the selected hair colorant as the recipe on the machine-readable label using a machine-readable label printer.

12. The apparatus of claim 8 further comprising:
the processor;
the non-volatile memory; and
wherein the processor and the memory comprise circuits and software for performing the instructions on the storage medium.

13. The apparatus of claim 8 wherein the instructions which when executed by a second processor will cause the second processor to:
receive, through a communications interface, a reorder request over a network for the selected hair colorant, the reorder request including the recipe;
direct a second machine readable label printer to output a second machine-readable label including the recipe to create the selected hair colorant;
direct a second machine-readable language scanner to scan the second machine-readable label incorporating the recipe;
operate a second series of flow control mechanisms in response to data from a second high-precision scale to accurately measure an amount of each of the hair colorant combinates while disengaging and engaging at least one of the second series of flow control mechanisms to release at least one of the hair colorant combinates in an amount directed by the recipe printed on the machine-readable label to recreate the selected hair colorant.

14. The apparatus of claim 13 wherein the second processor is a part of a second dispenser which is a remote manufacturing facility capable of filling hundreds of reorder requests in rapid succession.

* * * * *